United States Patent [19]
Akerberg

[11] 4,347,501
[45] Aug. 31, 1982

[54] INSTALLATION FOR TRANSMITTING ALARM SIGNALS

[75] Inventor: Dag Akerberg, Järfälla, Sweden

[73] Assignee: Telefonaktiebolaget L M Ericsson, Stockholm, Sweden

[21] Appl. No.: 195,637

[22] PCT Filed: Sep. 13, 1979

[86] PCT No.: PCT/SE79/00188

§ 371 Date: May 15, 1980

§ 102(e) Date: Apr. 18, 1980

[87] PCT Pub. No.: WO80/00630

PCT Pub. Date: Apr. 3, 1980

[30] Foreign Application Priority Data

Sep. 15, 1978 [SE] Sweden .............................. 78097425

[51] Int. Cl.³ .......................... G08B 1/08; H04Q 7/00

[52] U.S. Cl. .................................... 340/539; 340/531; 340/506; 340/536; 340/573; 340/825.36; 455/9; 455/11

[58] Field of Search ............... 340/539, 571, 572, 573, 340/152 T, 23, 24, 38, 536, 505, 534, 287, 291, 305, 306, 307, 531, 506, 870.09, 870.11, 870.16, 870.31, 825.06, 825.15, 825.36, 825.69; 343/6.5 R, 6.8 R, 6.8 LC; 455/11, 16, 38, 53, 54, 50, 63, 89, 95, 100, 9, 13

[56] References Cited

U.S. PATENT DOCUMENTS 3,644,883 2/1972 Borman et al. ........................ 340/23
3,864,674 2/1975 Worsham et al. .................. 340/539
3,914,692 10/1975 Seaborn .............................. 340/539
3,925,763 12/1975 Wadhwani et al. ................ 340/539
3,973,200 8/1976 Akerberg ............................. 455/38

*Primary Examiner*—Thomas A. Rubinson
*Assistant Examiner*—Donnie L. Crosland
*Attorney, Agent, or Firm*—Hane, Roberts, Spiecens & Cohen

[57] ABSTRACT

In an installation for transmitting alarms, preferably in connection with attacks on persons, and for locating the alarm sender, there is at least one portable alarm sender 2 sending an alarm to a central alarm receiver (3) by radio. The senders each contain a memory (24) for a code unique to their position in the installation. The code is automatically set by fixed transmitters (1) having a small range, which transmit it electromagnetically, especially inductively, to the sender (2), the code being unique to the location of a transmitter and stored in the sender memory. When fixed transmitters (1) are arranged so close together that their unique codes are difficult to separate in the sender (2), a dummy transmitter (56) is arranged to prevent alteration of a code already stored in the memory (24) of the alarm sender, as long as the sender (2) is close to the dummy transmitter (56). The sender (2) also transmit a second code stored in a second memory, unique to the individual alarm sender and thereby to the carrier of the alarm sender.

3 Claims, 4 Drawing Figures

INSTALLATION FOR TRANSMITTING ALARM SIGNALS

FIELD OF THE INVENTION

The present invention relates to an installation for transmitting alarm signals, primarily in cases of personal attack, and localizing alarm transmitters.

DESCRIPTION OF PRIOR ART

For the staff of hospitals, prisons and other custodial institutions there is a need for calling for help in assault or battery by means of an alarm sender which can be carried in a pocket.

In such installations it is important that the place from which an alarm has been sent can be localized. Localization can be done with aid of an alarm receiver, so that every room in a building is provided with an alarm receiver. In such case since only the alarm receiver in the room where the alarm signal has been sent reacts to an alarm, localization is carried out simply. Thus the propagation of the alarm signal is limited by the walls of the room when the alarm signal is sent supersonically or by infrared light. A serious drawback with alarm transmission in this mode is that transmission is hindered or heavily dampened if the alarm sender is kept under clothes or if it were to be under the body during a struggle. It should specifically not be necessary to take out the alarm sender in an assault, since this itself can initiate the aggressive action.

If a radio transmitter is used instead for sending the alarm, it can be carried in the clothes and does not need to be taken out to send an alarm, since radio transmission penetrates through clothes quite easily. The good penetration ability of radio transmission, however, excludes localization of the alarm sender with the help of receivers in each room, since the emissions from the transmitters are not limited by the walls of a room. Attempts to localize such an emission by taking bearings is made impossible by all the reflections obtained from the building walls.

It would be easy to localize the radio transmitter sending an alarm if the transmission contained a code notifying the location of the alarm sender, but requiring staff to set a variable room code on their alarm senders is not reasonable in practice. Staff should not need to think about the alarm sender except at the moment when it needs to be used.

SUMMARY OF THE INVENTION

According to the present invention, a room code is automatically set in the alarm sender, giving its position in the building. The set room code is automatically changed when the alarm sender is carried from one place to another. When an alarm is sent, the latest stored room code is sent by radio to a central alarm receiver. The room code received in the alarm receiver is stored in a memory and the position of the sender is shown on a digital display. How coded messages are sent by radio and received and displayed in a central receiving station is already described in the U.S. Pat. No. 3,678,391.

The room code in the alarm senders is reset as follows: A number of small, locally fixed transmitters, with continuous electromagnetic emission, in this case inductive emission, are placed in a building, and send a code unique for the position of the fixed transmitter to a receiver in each alarm sender, this code therefore being called the room code. The received code is stored in a memory in the sender, and if the sender is triggered for sending an alarm, the stored code is transmitted with the radio signal to the central alarm receiver.

Each fixed transmitter is suitably placed in one door frame so that transmission of the room code takes place when the alarm sender passes through door frames between different rooms. The code transmitted by the fixed transmitter is thus unique for the door frame where the transmitter is placed. The fixed inductive transmitters for the unique code only transmit with low power, and their transmitting antenna is a small magnetic dipole antenna. Since the transmitting power is low and the field strength from a small dipole antenna is, to the first approximation, inversely proportional to the cube of the distance from the antenna, the clear domination of the field strength from a transmitter in a door frame over the field strength from transmitters in other door frames is thus ensured.

For wide doors it may be necessary for a transmitter to feed two dipole antennae, one in each door jamb.

Inductive transmission of the room code has been selected not only because it penetrates clothes without difficulty, so that the alarm sender can be carried in a pocket, but also because the propagation of the magnetic field from the dipole antenna of the fixed transmitter can be accurately calculated and limited to the areas nearest to a door opening.

The inductive receiver for receiving the room code in a portable alarm sender will be alternately exposed to strong fields at the door openings and almost no fields at a short distance therefrom, and sometimes to the interaction of nearly equal strong fields from two inductive transmitters. This results in that the inductive receiver of the alarm sender alternatingly receives strong signals having correct codes and signals with incorrect, interrupted or mixed codes. Parity bits are therefore added to the room codes, and a decoder placed in the inductive receivers of the alarm sender are adapted for reading the parity bits and discovering errors in the received codes. Incorrect codes will thus be rejected and not allowed to alter a room code already stored in the memory of the alarm sender.

If a doorway is placed very close to the wall of a room, other than the one to which the doorway in question leads, the field strength from the transmitter in the doorway can be stronger in a portion of the first room than the field strength from the transmitter in the door frame of this room. To prevent unwarrented resetting of the alarm sender code at any place in the first room, a dummy sender can be arranged, which is adapted to transmit a signal preventing alteration of a unique code already stored in the memory of the radio transmitter.

Receivers for inductively transmitted coded signals of the kind used here, their decoders and memories are known in the prior art as apparent from the U.S. Pat. No. 3,665,313.

All the portable radio transmitters in an installation are intended to send on the same radio channel with the same frequency.

The portable alarm senders can also be provided with a memory for a permanently stored code which is unique to a particular alarm sender. In an emergency, this code is transmitted immediately after the code which is unique to the location from which the alarm has been sent, thus indicating in the alarm centre which sender and thus which person has sent the alarm.

BRIEF DESCRIPTION OF THE DRAWINGS

An installation in accordance with the invention will now be described while referring to the accompanying drawing in which.

PREFERRED EMBODIMENT

Figure 1:
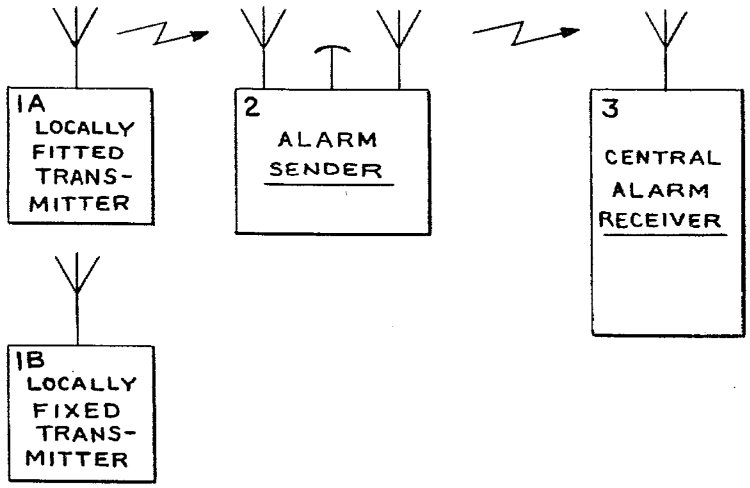
FIG. 1 is a principle block diagram of the installation.

The installation in accordance with the invention includes, as illustrated in FIG. 1, a plurality of locally fixed transmitters, of which two, 1A, 1B are shown in the Figure. The installation further comprises one or more alarm senders 2 and a central alarm receiver 3.

Figure 2:
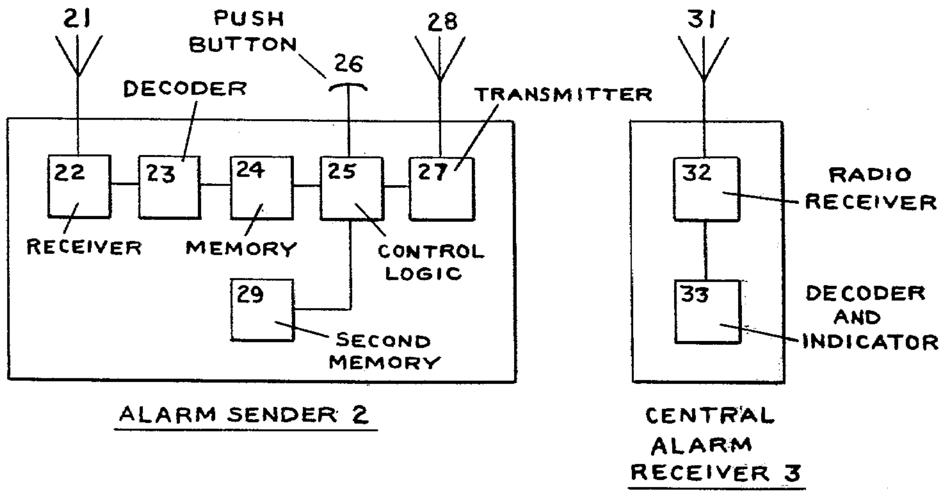
FIG. 2 is a block diagram of an alarm sender and a central alarm receiver.

The alarm sender 2 includes, as is apparent from FIG. 2, an antenna 21 for receiving inductively transmitted signals; a receiver 22 with amplifier, connected to the antenna 21; a decoder 23 for received signals; a memory 24 for storing a received code, connected to the decoder; a control logic circuit 25, operable by means of a push button 26, for controlling the transmission of the code stored in the memory 24, with the help of a radio transmitter 27 and antenna 28, connected to the logical circuit 25.

As is apparent from FIG. 2, the central alarm receiver 3 includes a receiver antenna 31 for radio signals, a radio receiver 32 with amplifier and a decoder with indicator 33 for displaying received messages.

When an alarm is to be sent by the sender 2, e.g. in a case of assault, the button 26 on the sender carried in the pocket of the wearer is pressed by the wearer. The control logic circuit 25 will thus become operable for transmitting, by means of the radio transmitter 27, radio signals coded with the room code stored in the memory 24 and unique to the place where the sender is at the moment.

The alarm sender radio transmitter 27 transmits with a frequency selected in the 160 MHz-waveband, for example.

The radio signal from the sender is received by the central alarm receiver 3 and the unique code is shown on the display 33.

In some installations, the sender 2 is also provided with a second memory 29. In this memory there is stored a second code unique to the individual sender, and thus also to the person carrying the sender. The control logic circuit 25 is adapted for sending the second code immediately after the first code when an alarm is sent. The display 33 in the central receiver shows the designation of the person who has sent the alarm.

Such techniques are notoriously wellknown and are shown and described with respect to apparatus for transmitting and indicating coded radio signals in said U.S. Pat. No. 3,678,391.

Figure 3:
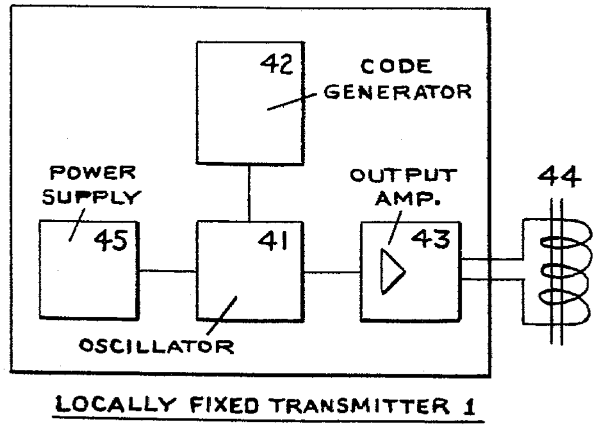
FIG. 3 is a block diagram of a locally fixed transmitter.

The room code stored in the memory 24 is transferred inductively to the carried alarm sender when it comes in the immediate vicinity of one of several fixed transmitters in the installation. In each such fixed transmitter 1 there is included, as is shown in FIG. 3, a modulatable oscillator 41, a code generator 42 with a code memory connected to the oscillator, an output amplifier 43 connected to the oscillator and a magnetic dipole antenna 44 connected to the output amplifier. A voltage supply unit 45 is connected to the three first-mentioned part units for supplying them with the necessary voltages.

Figure 4:
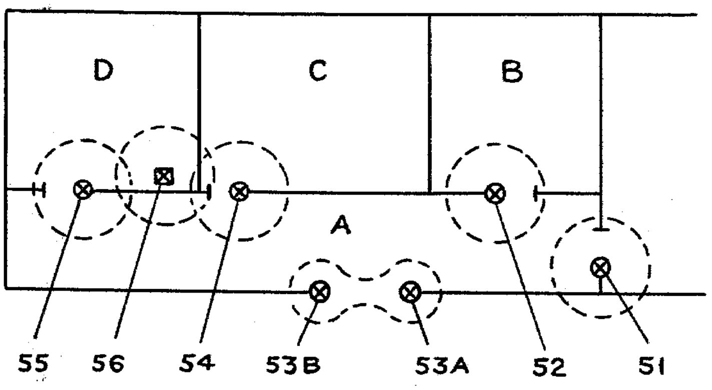
FIG. 4 is the floor plan of a building with examples of the placement of fixed transmitters.

The fixed transmitters 1 are placed in the installation, e.g. as is apparent from FIG. 4. The figure is a floor plan of a building with rooms A,B,C and D. So that the fixed transmitters will act reliably on the carried alarm senders, they are placed in door frames or in other narrow passages. The transmitting power from the fixed transmitter, e.g. transmitter 51 in FIG. 4 is small, and the field strength from the small dipole antenna of the transmitter is inversely proportional to the cube of the distance from the antenna, to a first approximation, it thus being ensured that the field strength of the transmitter in a door frame clearly dominates over the field strength of transmitters in other door frames, e.g. transmitter 52.

If a door is especially wide, two dipole antennae 53A, 53B may be needed, one in each door jamb and connected to the same fixed transmitter. A magnetic loop can alternatively be arranged around the door frame instead of the dipole antennae.

The inductive transmission enables the fixed transmission to be manufactured in a single monolitic circuit. The dipole antenna, monolith and voltage supply unit are molded together to one unit for fitting into the door jamb.

The fixed sender 1,51 transmits a code continuously and inductively, such code being unique to the door etc. where it is placed, and when an alarm sender 2 is carried through the doorway the voltage will be sufficiently great in its receiver antenna 21 in FIG. 2 for the code to be written into the sender memory 24. If the sender is subsequently carried past another fixed transmitter, e.g. 52, its unique code, differing from the previous one, is transmitted, and the new code is written in over the one already in the sender memory. In this way the alarm sender will always be updated with the code unique to its momentary location, and it is this code which is transmitted when an alarm signal is sent.

Parity bits are added to the typical code so that the right codes will be received in the alarm sender, in spite of strongly varying field strengths at its receiver. Reception reliability can be further increased by exchanging the latest code put into the sender memory 24 only when two new identical and correct codes have been received in immediate sequence. The transmission rate should be at least five codes per second so that two codes will be reliably received during a hasty passage through the doorway. The fixed transmitters transmit a frequency selected in the range of 16–140 kHz.

Apparatus for inductively transferring coded signals, their decoders and memories are known in principle, e.g. from inductive staff locator equipment, and therefore no detailed description thereof is considered necessary.

A fixed transmitter, e.g. 54 in FIG. 4, can be placed in a door frame of a room C, so close to an adjacent room D that in a corner of the room D an alarm sender, which has been given a unique code set by the transmitter 55 could get the code altered by the transmitter 54, which would be incorrect. Such unwarranted alteration of the typical code is prevented by arranging a dummy transmitter 56 between both fixed transmitters. The dummy 56 is substantially the same as the other fixed transmitters, but is adapted for only sending a carrier wave with the same frequency as the one from the fixed transmitters. The dummy transmission blocks the receiver in the alarm sender and prevents reception of such transmission which can lead to resetting the stored code. The dummy transmission can also be modulated to obtain greater blocking action.

The radio transmitters of the alarm senders are normally adapted for transmitting at the same frequency. The risk of two alarm senders sending an alarm simultaneously and thus blocking each other is very small. If it is feared even so that alarms could be sent simultaneously, the risk of blocking can be reduced by making the alarm transmission short, e.g. 70 mS and repeating it after a comparatively long interval of 2 seconds. The risk of blocking is further reduced if the intervals between the alarm transmissions are made somewhat different for individual alarm senders.

What we claim is:

1. An alarm system for use in an area having a plurality of localized regions for indicating in which of the localized regions the alarm is given, said alarm system comprising: a central alarm receiver means for receiving coded alarm signals and giving area indications in accordance with received coded location-identifying alarm signals; a plurality of fixed short range transmitter means, each of said fixed transmitter means being in one of the localized regions for inductively transmitting coded location-identifying alarm signals unique to the localized region only within a short range associated with said region and not to said central alarm receiver means; and a plurality of personal portable alarm senders, each of said senders including a receiver means for receiving and storing the coded location-identifying alarm signals emitted by the fixed short range transmitter means when in close proximity thereto so that as a portable alarm sender is moved through the area it stores the coded location-identifying alarm signals associated with the localized region of its instant location to the exclusion of other coded location-identifying alarm signals, and a fixed dummy transmitter means in proximity with two of said fixed transmitter means in an area where the two transmitters having an area of partially overlapping transmission ranges for preventing the receiver means of a sender in that area from receiving and storing any coded location-identifying alarm signal other than the one already stored, and each of said senders including user-operable transmitter means for emitting stored coded-location alarm signals to said central alarm receiver means, said user-operable transmitter means having a range which is greater than the range of said short range transmitter means.

2. The system of claim 1 wherein the transmitter means of each sender when energized periodically emits the alarm signals, the repetition period being considerably longer than the time for emitting the alarm signals themselves.

3. The system of claims 1 and 2 wherein each sender includes further means for storing coded sender-identifying alarm signals so that the associated transmitter means emits both coded location-identifying alarm signals and coded sender-identifying alarm signals.

* * * * *